United States Patent
Hayton

(10) Patent No.: US 6,203,025 B1
(45) Date of Patent: Mar. 20, 2001

(54) SEAL

(75) Inventor: Paul R Hayton, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/267,349

(22) Filed: Mar. 15, 1999

(30) Foreign Application Priority Data

Mar. 18, 1998 (GB) .................................................. 9805779

(51) Int. Cl.⁷ ............................................................. F16J 15/02
(52) U.S. Cl. ............................ 277/644; 277/637; 277/906
(58) Field of Search .................................... 277/644, 626, 277/906, 921, 637

(56) References Cited

U.S. PATENT DOCUMENTS

| | | | |
|---|---|---|---|
| 3,285,615 | * 11/1966 | Trbovich | 277/644 |
| 3,713,660 | * 1/1973 | Luthe | 277/644 |
| 5,738,490 | * 4/1998 | Pizza | 415/139 |

FOREIGN PATENT DOCUMENTS

| | | |
|---|---|---|
| 1 600 966 | 10/1981 | (GB) . |
| 2 153 030 | 8/1985 | (GB) . |
| 2 240 822 | 8/1991 | (GB) . |

* cited by examiner

Primary Examiner—Anthony Knight
Assistant Examiner—Enoch E. Peavey
(74) Attorney, Agent, or Firm—Oliff & Berridge, PLC

(57) ABSTRACT

A longitudinal seal in the form of a strip member for sealing a gap between adjacent jet pipe liner panels, for example. The liner panels are individually suspended from the internal wall of the jet pipe by separate supports with narrow clearance gaps between neighbouring panels which have to be sealed. A seal has to be provided between adjacent panels which is capable of accommodating relative movements and misalignments between adjacent structures. The seal disclosed essentially comprises a long strip of a metal alloy folded lengthwise several times to form a compliant section in the form of a box pleat between two edge portions which may be engaged in lengthwise slots on the two supporting structures facing each other.

7 Claims, 1 Drawing Sheet

U.S. Patent  Mar. 20, 2001  US 6,203,025 B1

SEAL

The invention relates to a seal member and, in particular, it concerns a longitudinal seal in the form of a strip member for sealing a gap between adjacent elongate structures.

The embodiment of the invention, which will be described hereinafter, was conceived as a solution to a problem of providing a seal between jet pipe liner segments of an afterburning gas turbine propulsion engine. However, the invention may be found useful in any situation where a seal is required to seal an elongate gap between adjacent structures which may be subject to a degree of limited relative movement.

According to the present invention there is provided a longitudinal seal in the form of a strip member having two longitudinal edge portions either side of a long compliant section comprising at least one lengthwise extending corrugation of sufficient flexibility to permit a degree of limited relative movement between the edge portions.

According to the preferred form of the invention the strip member is pleated in a lengthwise direction to form the two edge with the corrugated section lying between them. Preferably the pleat is of the kind known as a box pleat.

Figure 1:
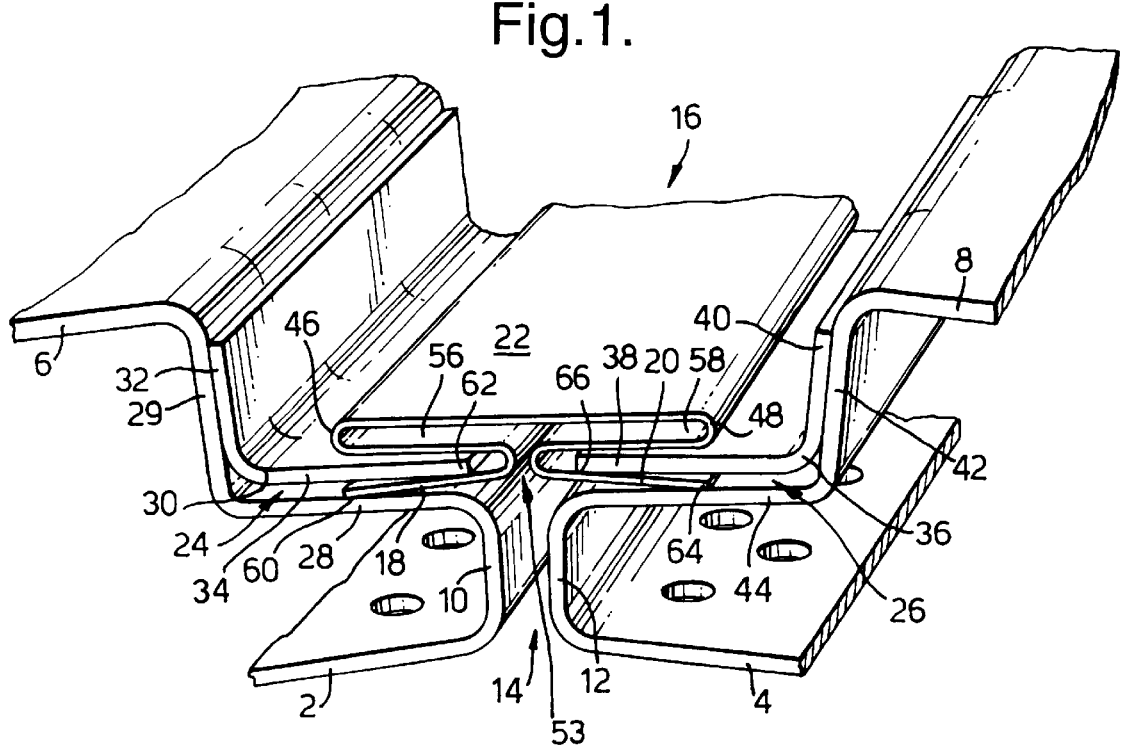
Figure 2:
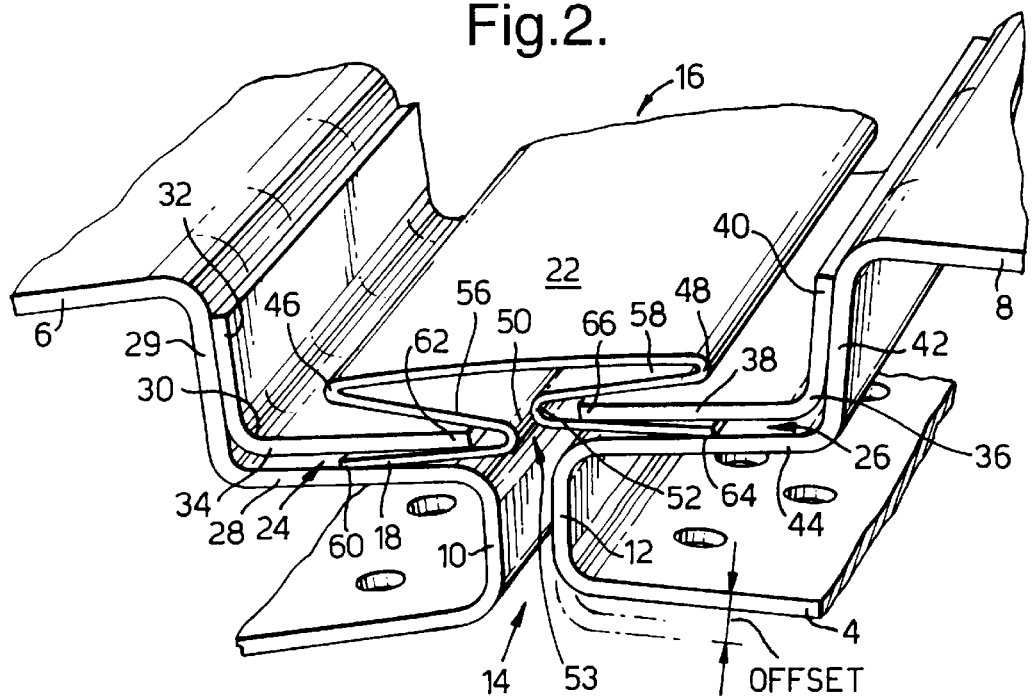

The invention will now be described in more detail with reference, by way of example, to the accompanying drawings of a preferred form of the invention, in which:

FIG. 1 is a detail of a perspective view, partly sectioned, of two adjacent jet pipe liner segments and the inter-segment seal under cold assembly conditions, and FIG. 2 is a similar view of the arrangement of FIG. 1 under typical operating conditions in which the adjacent segments are mutually offset.

Referring now to the drawings, there are shown similar illustrations of the adjacent edges of two neighbouring afterburner segments, their integral support structures and an inter-segment seal under different conditions, so that between the views of FIGS. 1 and FIG. 2 the two segments are offset one relative to the other. For the sake of clarity in the drawings they are confined to close-up views of the part of immediate interest. The jet pipe and further liner segments, which would be mere repetitions of the illustrated view, are omitted.

Briefly, the background to the invention involves the kind of gas turbine propulsion system which uses a bypass core engine in which the cold bypass air flow and the hot turbine exhaust flow are largely segregated in the exhaust jet pipe over at least a proportion of its length. One reason for this, although not of immediate relevance to the invention, is to provide a cooling air flow to a final exhaust nozzle. Conventionally these hot and cold flows are segregated by a physical barrier in the form of a liner mounted concentrically inside the jet pipe by means of a supporting structure attached to the inside of the jet pipe casing. Depending upon the transient operating conditions there exists a substantial and occasionally fluctuating pressure differential between the two flows which produces high loadings and load changes on the liner. The mechanical design of the supporting structure designed to contain these loads, and also the substantial differential thermal expansion movements which occur, is not of immediate concern. For the purposes of this description the jet pipe liner may be summarised as a plurality of longitudinally extending panels, arranged in a circumferential array around the inside of jet pipe and individually suspended therefrom by a plurality of supports. Longitudinal gaps are present between confronting edges of adjacent liner panels and these have to be sealed. The present invention provides such a seal which meets the sealing requirements and is able to withstand the pressure loads and structural movements without compromise to seal integrity.

Referring now to the drawings: neighbouring parts of two adjacent jet pipe liner panels are indicated at 2,4 together with portions of their supporting structures at 6,8 respectively. Only the neighbouring portions of the panels and structures are shown enabling the drawings to be scaled for clarity. Essentially the panels and supporting structures comprise sheet materials, preferably composed of nickel alloy but alternatives are not to be excluded, which are bent to the required shapes. The panels 2,4 are shown joined to or formed integrally with their supporting structures 6,8 but this need not be the case, and the panels could be detachably mounted. The adjacent margins of the panels 2,4 are bent upwards, approximately through a right angle, forming confronting side faces 10,12 respectively which are separated by a gap 14 running the entire length of the panels 2,4. Although the liner panels are all nominally identical they are individually mounted and assembled and thus are inevitably susceptible to mutual misalignment and differential growth, distortion etc. Therefore the gap 14 between adjacent panels is not necessarily parallel at build nor is it certain to remain constant. For example FIG. 2 shows a radial offset which occurs typically under operating conditions.

An inter-panel gap seal is generally indicated at 16 and is tolerant to these misalignments and changing alignments without deleterious effect upon its seal function. The seal 16 comprises a strip of material, preferably metal e.g. nickel alloy like the liner panels 2,4 which is folded to form two longitudinal edge portions 18,20 either side of a long compliant centre section 22. The opposite edges 18,20 of the seal are engaged with opposing slots 24,26 on the neighbouring support structures 6,8. These slots are formed on a shoulder 28 of each supporting structure by an additional member attached thereto. The shoulder 28 is formed along the length of the panel and extends in a circumferential direction substantially at right angles from an adjacent part 29 of the support. A plate 30 is bent over so that it comprises two sections 32,34 at approximately a right angle. It is fixed by one section 32 to the radial section 29 of the support structure in such a position that the orthogonal section 34 is parallel to and spaced apart from the shoulder 28. The sections 28,34 between them define the elongate seal receiving slot 24. In similar fashion a further plate 36 bent to form two sections 38,40 is attached to a radial section 42 of the support structure 8 spaced apart from a shoulder 44 to form the receiving slot 26. Thus, the confronting shoulders of adjacent support structures carry opposing slots, and this arrangement is repeated around the circumferential array.

The seal member, as previously mentioned, comprises generally longitudinal edge portions 18,20 either side of a compliant centre section 22. To permit a degree of limited relative movement between the edge portions the compliant centre section is made in the form of a lengthwise extending corrugation for the required flexibility. The edge portions 18,20 are engaged with two neighbouring support structures 6,8 by inserting the portions 18,20 into the slots 24,26. Further details of this will be discussed below together with the manner in which sealing is achieved and maintained. The centre section 22 must perform a number of functions which are potentially in conflict: it must permit the above mentioned limited relative movement of the liner support and withstanding pressure differentials and fluctuations, all the while sustaining the integrity of the seal.

The corrugated centre section of the seal is formed in the strip member by several lengthwise extending folds 46,48, 50,52 which, in combination, give the corrugated portion of the preferred embodiment the form of a pleated section. The folds are made in parallel and the directions of the folds cooperate to form a pleat of the kind commonly known as a box pleat. The middle section 22 of the strip is flanked by folds 46,48 of substantially 180° which direct both margins 56,58 towards the centre of the strip. These margins are then folded outwards at 50,52, again through almost 180°, to articulate the edge sections 18,20. The pairs of opposite fold lines 46,50 and 48,52 which join the edge portions 18,20 respectively to the middle section introduce sufficient compliance to accommodate radial offset and skew misalignments, and combinations thereof, of one structure relative to a neighbouring structure. The width of the edge portions 18,20 and the intermediate margin sections 56,58 are each approximately equal to half the overall width of the seal.

The edge portions 18,20 provide sealing along multiple lines of contact with the surfaces in the interior of the receiving slots 24,26. The angles at the folds 50,52 especially, but all the fold lines contribute, are chosen so that the edge portions 18,20 are not co-planar but subtend an included angle of slightly less than 180°. As a result each edge portion 18,20 has two lines of sealing contact. With reference to the left flank of the seal in the drawings a first seal line is produced along a contact line 60 between the lip of edge portion 18 and the surface of the shoulder 28. A second seal line is produced along a contact line 62 between the lip of the plane 34 and the surface of the seal edge portion 18. In similar manner, on the right flank of the illustrated seal a further two lines of seal contact are produced at 64,66 between the seal edge portion 20 and the shoulder 44 and the plate 38 respectively.

Thus, a possible gas path on either flank of the seal contains two lines of seal contact and these are maintained irrespective of the disposition of the neighbouring structures, within the limits of design movement. The edge portion 18,20 of the seal remain static relative to the structures and all relative movements etc is absorbed by the corrugated section joining them together, that is by relative movement of the intermediate sections 56,58 and the middle section 22 at the fold lines joining them.

The inner margins of the edge portions 18,20 formed by the lengthwise extending folds 50,52 are spaced apart by a clearance gap 53 thereby forming an opening into the interior of the corrugated or pleated sections of the seal. Given the relative movement of the two sides of the seal in use, this gap 53 does not remain static or constant. However, the corrugated section of the seal prevents hot gas passing through the gap escaping into the relatively cooler surrounding passageway.

What is claimed is:

1. A longitudinal seal in the form of a strip member having two longitudinal edge portions on either side of and substantially parallel to a long compliant section comprising at least one lengthwise extending corrugation of sufficient flexibility to permit a degree of limited relative movement between the edge portions.

2. A longitudinal seal as claimed in claim 1 wherein the strip member is pleated in a lengthwise direction to form the two edge portions and the corrugated section between them.

3. A longitudinal seal as claimed in claim 2 wherein the pleat is of the kind known as a box pleat.

4. A longitudinal seal as claimed in claim 1 wherein the width of each of the edge portions is nearly half the overall width of the seal.

5. A longitudinal seal as claimed in claim 1, wherein each of the edge portions has inner margins and there are at least two lengthwise extending corrugations having facing corrugation folds and the inner margins of each of the edge portions formed by the lengthwise extending facing corrugation folds are spaced apart by only a clearance gap to form an opening into the interior of the corrugated section.

6. A longitudinal seal as claimed in claim 1 wherein the strip member is composed of a high temperature material.

7. A longitudinal seal as claimed in claim 1, wherein the strip member is composed of a nickel alloy.

* * * * *